Patented Apr. 9, 1935

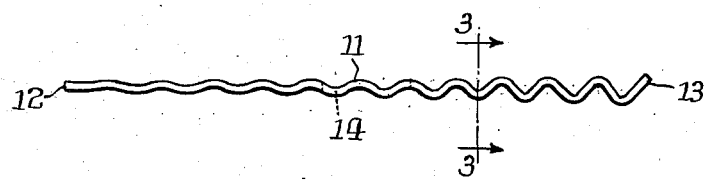
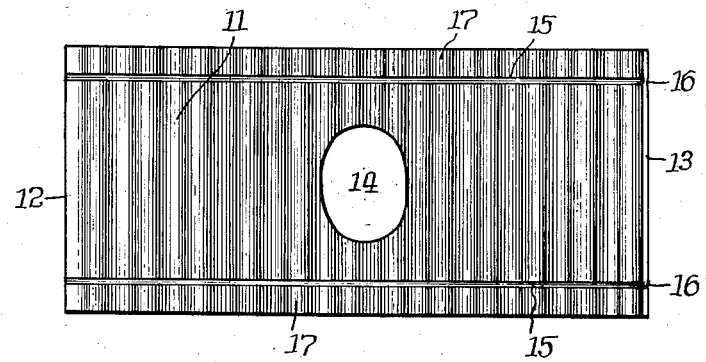
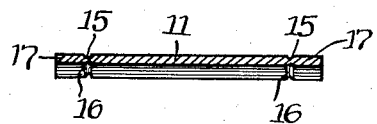

1,997,384

UNITED STATES PATENT OFFICE 1,997,384

SHIM

William Keim, Springfield, Ill., assignor to Weaver Manufacturing Company, Springfield, Ill., a corporation of Illinois Application March 14, 1934, Serial No. 715,424

1 Claim. (Cl. 267—52)

The present invention pertains to a new form and style of elongated wedge or tapered shim, such, for example, as is commonly employed between the leaf springs of an automobile and the spring saddle or seat on its supporting axle.

By reason of changes in the shapes of vehicle-springs, due to continued use or accident, or by reason of distortion or injury to the axle itself, it becomes desirable or essential to overcome the detrimental results of such occurrences in a simple and inexpensive manner, and, in many cases, the defect or fault may be cured or remedied for all practical functioning purposes by the use of such wedge shims in the location or relation stated.

One object of the present invention is to provide a novel and improved type of shim which is designed and adapted to find a better seat or bearing on the spring saddle and to overcome the objectionable effects of one or more high spots on such saddle.

A further purpose of the invention is to reduce the weight and amount of metal incorporated in such shims.

An added aim of the invention is to supply a shim or wedge of this character the width of which can be readily modified and which at the same time can be positioned centrally with respect to the spring tie-bolt of the vehicle-spring.

In the accompanying drawing, forming a part of this specification and to which reference should be had in connection with the following detailed description, a present preferred embodiment of the invention has been shown, and for the sake of clearness the same parts have been supplied with like reference numerals throughout the views.

In this drawing:—

Figure 1 is an edge view of the improved and novel shim or wedge;

Figure 2 is a face view of the same; and

Figure 3 is a cross-section on line 3—3 of Figure 1.

By reference to this drawing, it will be perceived that the novel shim or wedge is formed of a metal plate 11 preferably, but not necessarily, of uniform gauge or thickness, transversely or laterally corrugated, ribbed or of wave or serpentine formation, with the cross corrugations or hollow ribs gradually and progressively increasing in size or depth from one end of the plate to the other, the one end 12 of the plate being practically or actually free from such cross elevations and valleys, whereas those near the opposite end 13 of the plate are of substantial measure, all as is fully and clearly depicted in the edgewise view of Figure 1.

One advantage of such a wedge or shim element is that not infrequently the axle spring-seat or spring-saddle of an automobile on which such shim beneath the vehicle-spring is adapted to rest and bear is not an exactly plane surface but may have some spots higher than others.

Such minor elevations may be accommodated by chance in the lateral or cross grooves in the undersurface of the shim, or, if they are not so located as to be thus cared for, the fluted or wrinkled form of the shim permits it to be deformed locally sufficiently to accommodate the high spots, thus allowing the wedge or shim as a whole to be fully seated or to bear properly and adequately on the members between which it is interposed.

Of course, if there are any similar high spots on the undersurface of the spring with which the wedge cooperates, it co-acts functionally therewith in practically the same manner.

Centrally the new shim or wedge has a hole or slot 14 therethrough, the dimension of such aperture crosswise of the plate being longer than its dimension lengthwise the plate, the object of such location and shape of aperture being indicated below.

The leaf springs of automobiles by reason of use are likely to sag in time, and to compensate for such deformation these wedge shims are designed to be inserted and held in place between the axle spring-seat and the vehicle-spring itself.

The superposed leaves of such springs are ordinarily bound or tied together as a unit by a tie-bolt extending through registering holes in the leaves, and the specified slot in the shim is employed to receive the end portion of such bolt or its nut.

A shim for such use must be sufficiently narrow to permit the U-bolt spring-clips to straddle it.

To avoid the necessity of keeping in stock shims of all desired widths, this new shim is made in such a way that its width may be readily changed as circumstances require.

To this end, or for the accomplishment of this purpose, registering grooves 15 and 16 in the upper and under faces of the wedge plate are provided adjacent to, and parallel to, each of the opposite longitudinal edges of the plate, thus forming reduced lines of breakage or severance on which the outer edge sections or portions 17, 17 of the member may be broken off as occasion requires to reduce the width of the shim in proper degree.

Accordingly, the shim may be employed in its full width, or it may be made of an intermediate width by the removal of either one of the long, narrow, marginal portions 17, or it may be reduced to its narrowest width by breaking off both of such parts 17, 17.

The tie-bolt of the vehicle-spring with which the shim is used must be in the middle of the shim so far as the crosswise dimension of the plate is concerned, and, accordingly, the slot 14 is of sufficient length transversely of the shim to accommodate such bolt centrally of the shim regardless of which single one of the parts 17 may have been broken off.

Of course, if the shim were always used full width or in its narrowest width, then a round, centrally-located hole would suffice, but such an aperture, unless unduly large, could not properly receive the spring tie-bolt if one side section only of the shim were removed.

From what precedes, it should be apparent that a wedge of the character shown and described can more or less readily adjust or adapt itself to slight inequalities in the surfaces on which it bears, that the new member can be made of less weight and with less metal than has heretofore been incorporated in solid, uncorrugated shims, and that the element can be positioned centrally of the spring and its bolt even though one only of its side parts has been removed.

The scope of the invention has been defined by the appended claim, but the fact that only one embodiment of the invention has been presented in detail is not to be considered as a limitation of the invention, because the latter is susceptible of a variety of embodiments differing more or less in structural details but all incorporating the fundamental principles as set forth in such claim.

I claim:

A wedge shim plate of substantially uniform thickness transversely corrugated with corrugations of gradually increasing depth lengthwise of the plate, each individual corrugation being of substantially uniform depth, whereby the shim as a whole tapers as to effective thickness longitudinally of the plate, the shim having an aperture therethrough for the accommodation of a spring tie-bolt.

WILLIAM KEIM.